(12) United States Patent
Sampath et al.

(10) Patent No.: US 12,292,194 B2
(45) Date of Patent: May 6, 2025

(54) IGNITOR HOUSING FOR A COMBUSTOR OF A GAS TURBINE

(71) Applicant: General Electric Company, Schenectady, NY (US)

(72) Inventors: Karthikeyan Sampath, Bengaluru (IN); Perumallu Vukanti, Bengaluru (IN); Ajoy Patra, Bengaluru (IN); Pradeep Naik, Bengaluru (IN); Hiranya Nath, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/823,198

(22) Filed: Aug. 30, 2022

(65) Prior Publication Data

US 2023/0366548 A1 Nov. 16, 2023

(30) Foreign Application Priority Data

May 11, 2022 (IN) .............................. 202211027100

(51) Int. Cl.
*F23R 3/00* (2006.01)
*F02C 7/264* (2006.01)

(52) U.S. Cl.
CPC .............. *F23R 3/005* (2013.01); *F02C 7/264* (2013.01)

(58) Field of Classification Search
CPC .......... F02C 7/264; F02C 7/266; F23R 3/005; F23R 2900/00009
See application file for complete search history.

(56) References Cited

U.S. PATENT DOCUMENTS

| | | | | |
|---|---|---|---|---|
| 3,990,834 A | * | 11/1976 | DuBell | F02C 7/18 60/39.821 |
| 5,085,040 A | * | 2/1992 | Tilston | F23D 11/10 431/265 |
| 5,636,511 A | * | 6/1997 | Pfefferle | F23C 13/00 60/39.822 |
| 9,057,523 B2 | | 6/2015 | Cunha et al. | |
| 9,625,151 B2 | | 4/2017 | Jause et al. | |
| 9,851,105 B2 | | 12/2017 | Propheter-Hinckley et al. | |
| 9,976,743 B2 | | 5/2018 | Propheter-Hinckley et al. | |
| 10,167,781 B2 | | 1/2019 | Toon | |

(Continued)

FOREIGN PATENT DOCUMENTS

EP 2963346 B1 5/2017

*Primary Examiner* — Arun Goyal
*Assistant Examiner* — Henry Ng
(74) *Attorney, Agent, or Firm* — Venable LLP; Edward A. Kmett; Michele V. Frank

(57) ABSTRACT

A combustor for a gas turbine includes a combustor liner, an outer casing surrounding the combustor liner, an ignitor housing extending through an ignitor opening through the liner, and an ignitor disposed within the ignitor housing. The ignitor housing includes a housing wall including at least one airflow inlet passage on a downstream side of the housing wall and arranged within the outer flow passage, and at least one cooling passage on the downstream side within the housing wall. The at least one cooling passage extends along a length of the ignitor housing from the at least one airflow inlet passage and through the inner end of the ignitor housing, the at least one cooling passage being in fluid communication with the at least one airflow inlet passage.

20 Claims, 13 Drawing Sheets

(56) References Cited

U.S. PATENT DOCUMENTS

| | | | |
|---|---|---|---|
| 10,309,314 B2 | 6/2019 | Hoke et al. | |
| 10,408,453 B2 | 9/2019 | Mongillo et al. | |
| 11,137,140 B2 | 10/2021 | Mongillo, Jr. et al. | |
| 2009/0064657 A1* | 3/2009 | Zupanc | F02C 7/264 60/39.821 |
| 2010/0212324 A1* | 8/2010 | Bronson | F23R 3/06 60/39.821 |
| 2011/0120132 A1* | 5/2011 | Rudrapatna | F02C 7/264 60/39.821 |
| 2013/0195546 A1* | 8/2013 | Ponziani | F23R 3/60 403/327 |
| 2014/0366505 A1* | 12/2014 | Prociw | F02C 7/266 60/39.821 |
| 2015/0040575 A1* | 2/2015 | Martinez Fabre | H01T 13/52 60/776 |
| 2015/0047361 A1* | 2/2015 | Williams | F23R 3/36 60/746 |
| 2016/0305325 A1* | 10/2016 | Cunha | F23R 3/06 |
| 2018/0100437 A1* | 4/2018 | DiCintio | F02C 7/264 |
| 2018/0252164 A1* | 9/2018 | Huang | F02C 7/264 |
| 2019/0010873 A1* | 1/2019 | Dam | F23R 3/343 |
| 2019/0032561 A1* | 1/2019 | Stoia | F23R 3/42 |
| 2019/0063329 A1* | 2/2019 | Ramamurthi | F02C 7/264 |
| 2019/0353351 A1 | 11/2019 | Bunel et al. | |
| 2022/0136444 A1* | 5/2022 | Ryon | F23Q 7/26 60/39.826 |
| 2022/0136696 A1* | 5/2022 | Ryon | F02C 7/264 60/39.821 |

* cited by examiner

IGNITOR HOUSING FOR A COMBUSTOR OF A GAS TURBINE

CROSS REFERENCE TO RELATED APPLICATIONS

The present application claims the benefit of Indian Patent Application No. 202211027100, filed on May 11, 2022, which is hereby incorporated by reference herein in its entirety.

TECHNICAL FIELD

The present disclosure relates to an ignitor housing for a combustor of a gas turbine.

BACKGROUND

Some gas turbine engines generally include a combustor that includes an outer casing surrounding a liner that defines a combustion chamber. The combustor may also include a plurality of swirl cups that inject a fuel-air mixture into the combustion chamber. The combustor may also include one or more ignitors (i.e., spark plugs) that are connected to the outer casing and extend through an opening in the liner to provide a spark for ignition of the fuel-air mixture within the combustion chamber.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
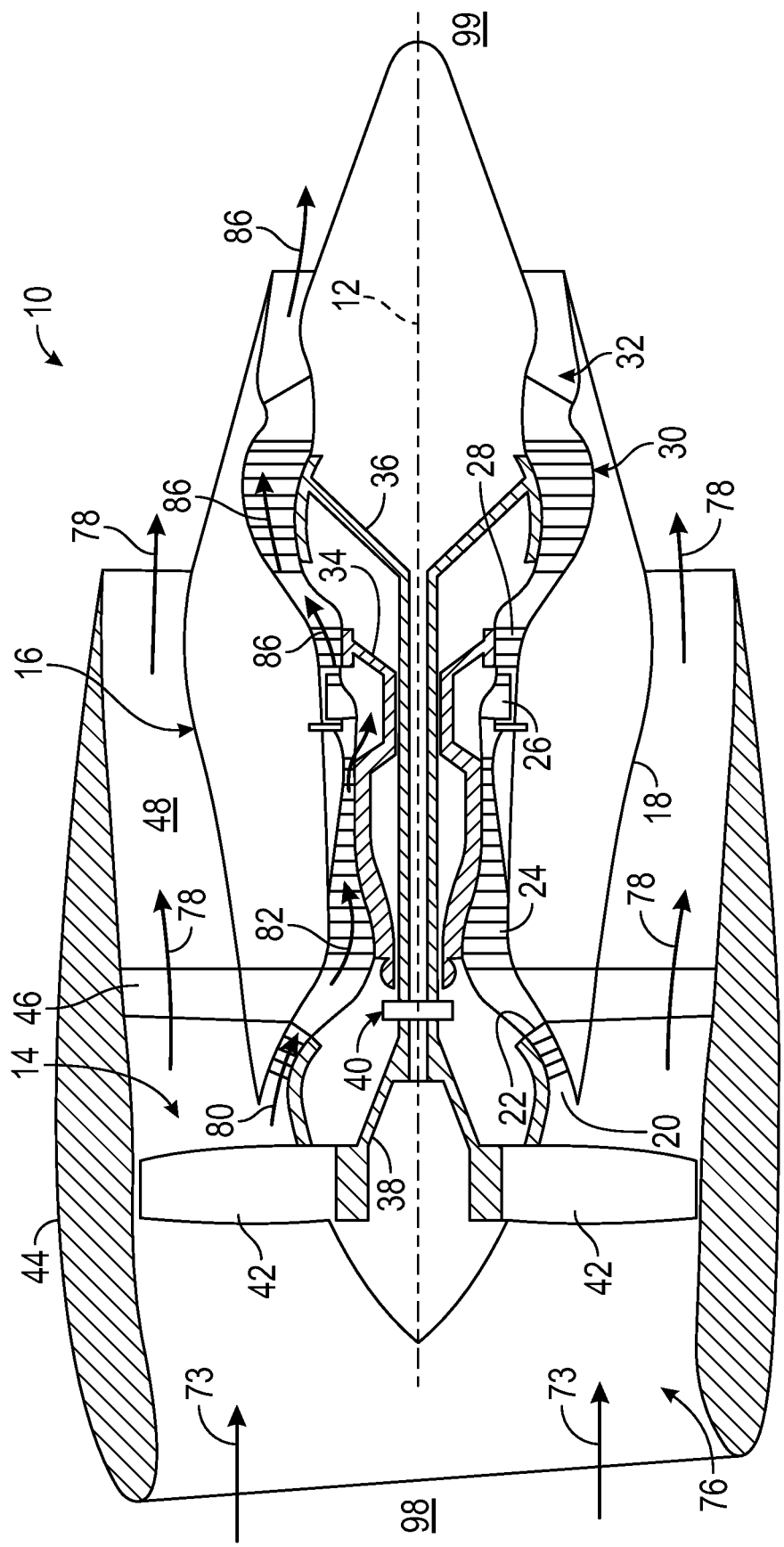
FIG. 1 is a schematic partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Some gas turbine engines generally include a combustor that includes an outer casing surrounding a liner that defines a combustion chamber. The combustor may also include a plurality of swirl cups that inject a fuel-air mixture into the combustion chamber. The combustor may also include one or more ignitors (i.e., spark plugs) that extend through an opening in the liner to provide a spark for ignition of the fuel-air mixture within the combustion chamber. When the fuel-air mixture is ignited and burned, hot combustion gases are formed within the combustion chamber and the hot combustion gases flow through the combustion chamber to a turbine nozzle at a downstream end of the combustion chamber. The hot combustion gases impinge upon a tip of the ignitor and also impinge upon the opening in the liner. The hot combustion gases, over time, can cause deterioration of the ignitor tip, and can also cause a breakdown of the liner at the ignitor opening, particularly on a downstream side of the ignitor opening.

The present disclosure provides a technique for reducing stress caused by the hot combustion gases on both the ignitor tip and on the liner at the ignitor opening. More particularly, the present disclosure provides an ignitor housing in which the ignitor is inserted, where the housing itself contains cooling passages within a wall of the ignitor housing. The cooling passages within the ignitor housing wall may be provided on a downstream side of the ignitor housing and provide an outlet flow of cooling air at the downstream side of the ignitor opening in the liner. The ignitor housing may also include a closed cooling cavity on an upstream side of the ignitor housing, where the closed cooling cavity is in fluid communication with the cooling passages. As a result, cooling air may be circulated within the ignitor housing on the upstream side so as to provide impingement cooling to the upstream side of the ignitor housing. Thus, various aspects of the present disclosure provide a flow of cooling air to the downstream side of the ignitor opening in the liner, thereby reducing the stress on the liner caused by the hot combustion gases and improving the reliability of the liner.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine-based turbine engines, industrial turbine engines, and auxiliary power units. As shown in FIG. 1, the engine 10 has an axial centerline axis 12 that extends therethrough from an upstream end 98 of the engine 10 to a downstream end 99 of the engine 10 for reference purposes. In general, the engine 10 may include a fan assembly 14 and a core engine 16 disposed downstream from the fan assembly 14.

The core engine 16 may generally include an outer casing 18 that defines an annular inlet 20. The outer casing 18 encases, or at least partially forms, in serial flow relationship, the core engine 15 having a compressor section (22/24) including a low pressure (LP) compressor 22 and a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or a nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
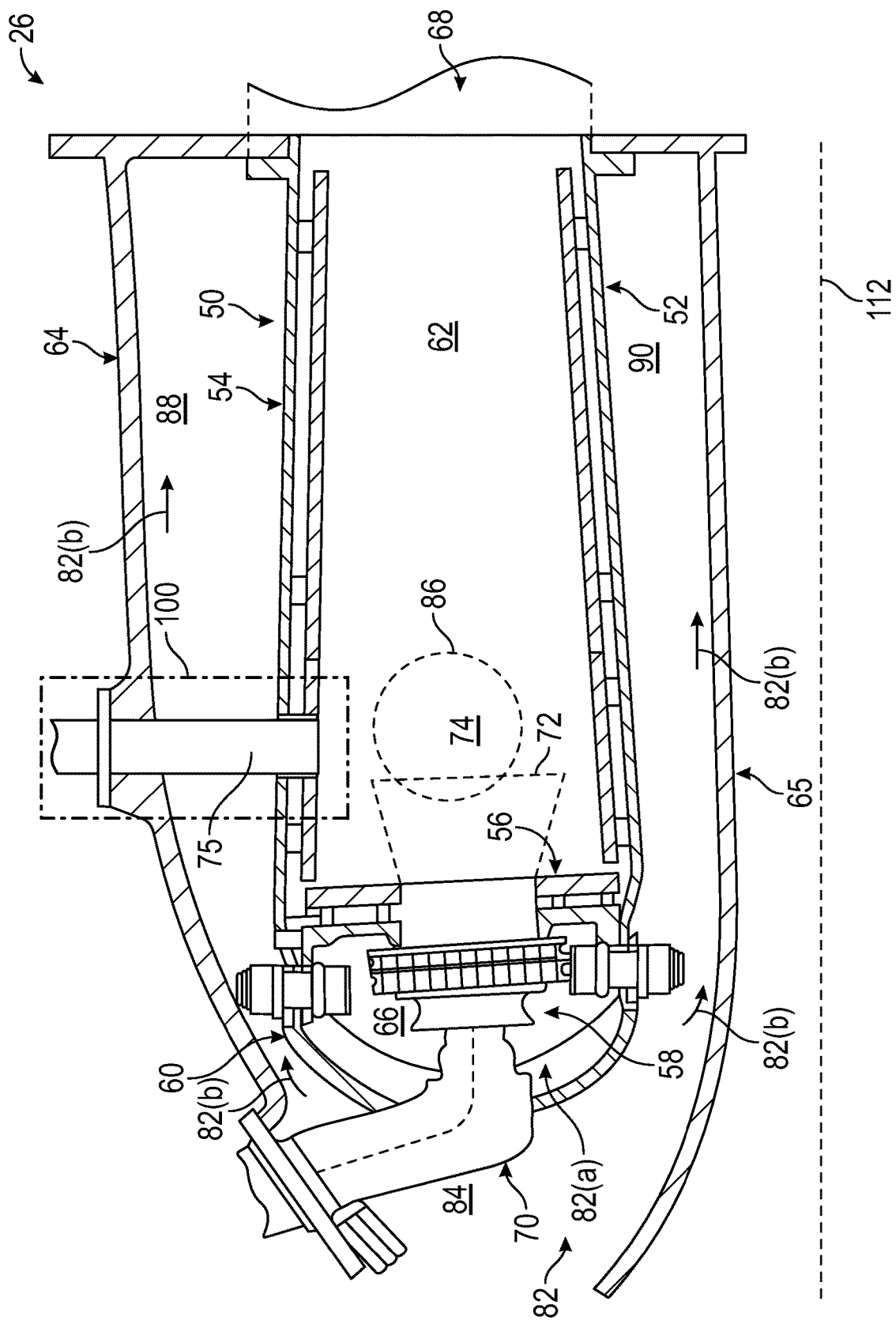
FIG. 2 is a partial cross-sectional side view of an exemplary combustor, according to an aspect of the present disclosure.

FIG. 2 is a partial cross-sectional side view of an exemplary combustor 26 of the core engine 16 as shown in FIG. 1. As shown in FIG. 2, the combustor 26 may generally include a combustor liner 50 having an inner liner 52 and an outer liner 54, and a dome assembly 56, together defining a combustion chamber 62. While FIG. 2 depicts an annular-type combustor having inner and outer liners, the present disclosure can be implemented in other types of combustors, such as can-type combustors or can-annular combustors. In FIG. 2, both the inner liner 52 and the outer liner 54 may extend circumferentially about a combustor centerline axis 112, which may correspond to the engine axial centerline axis 12 (FIG. 1). The inner liner 52 and the outer liner 54 are connected to a cowl 60, and a pressure plenum 66 is defined between the cowl 60, the inner liner 52, the outer liner 54, and the dome assembly 56. The combustor 26 also includes a mixer assembly 58 that is connected to a fuel nozzle assembly 70. While FIG. 2 depicts a single mixer assembly 58 and a single fuel nozzle assembly 70, a plurality of mixer assemblies 58 and respective fuel nozzle assemblies 70 may be included in the combustor 26, where each respective mixer assembly 58 and fuel nozzle assembly 70 are circumferentially spaced through the dome assembly 56 about the combustor centerline axis 112.

As shown in FIG. 2, the inner liner 52 is encased within an inner casing 65 and the outer liner 54 is encased within an outer casing 64. An outer flow passage 88 is defined between the outer liner 54 and the outer casing 64, and an inner flow passage 90 is defined between inner liner 52 and the inner casing 65. Both the outer casing 64 and the inner casing 65 may extend circumferentially about the combustor centerline axis 112. The inner liner 52 and the outer liner 54 may extend from the dome assembly 56 to a turbine nozzle 68 at an entry to the HP turbine 28 (FIG. 1), thus at least partially defining a hot gas path between the combustor liner 50 and the HP turbine 28. The combustion chamber 62 may more specifically define a primary combustion zone 74 at which an initial chemical reaction of a fuel-oxidizer mixture 72 occurs to generate combustion gases 86, and/or where recirculation of the combustion gases 86 may occur before the combustion gases 86 flow further downstream within the combustion chamber 62 and into the turbine nozzle 68 at the entry to the HP turbine 28 and the LP turbine 30 (FIG. 1).

During operation of the engine 10, as shown in FIGS. 1 and 2 collectively, a volume of air, as indicated schematically by arrows 73, enters the engine 10 from the upstream end 98 through an associated nacelle inlet 76 of the nacelle 44 and/or the fan assembly 14. As the air 73 passes across the fan blades 42, a portion of the air 73 is directed or routed into the bypass airflow passage 48 as a bypass airflow 78, while another portion of the air 73 is directed or routed into the annular inlet 20 and into the LP compressor 22 as a compressor inlet air 80. The compressor inlet air 80 is progressively compressed as it flows through the LP compressor 22 and the HP compressor 24 towards the combustor 26. As shown in FIG. 2, compressed air 82 flows into and pressurizes a diffuser cavity 84. A first portion of the compressed air 82, as indicated schematically by arrows 82(a), flows from the diffuser cavity 84 into the pressure plenum 66, where it is mixed by mixer assembly 58 with fuel provided by the fuel nozzle assembly 70 to generate a fuel-oxidizer mixture 72 that is ejected into the combustion chamber 62 by the mixer assembly 58. The fuel-oxidizer mixture 72 is ignited by an ignitor assembly 75 and burned to generate the combustion gases 86 within the primary combustion zone 74 of the combustion chamber 62.

Typically, the LP compressor 22 and the HP compressor 24 provide more compressed air 82 to the diffuser cavity 84 than is needed for combustion. Therefore, a second portion of the compressed air 82, as indicated schematically by arrows 82(b), may be used for various purposes other than combustion. For example, as shown in FIG. 2, compressed air 82(b) may be routed into the outer flow passage 88, and another portion of the compressed air 82(b) may be routed into the inner flow passage 90. In addition, or in the alternative, at least a portion of the compressed air 82(b) may be routed out of the diffuser cavity 84 for other purposes, such as to provide cooling air to at least one of the HP turbine 28 or the LP turbine 30.

Referring back to FIGS. 1 and 2 collectively, the combustion gases 86 generated in the combustion chamber 62 flow through the turbine nozzle 68 and into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsion at the downstream end 99.

Figure 3:
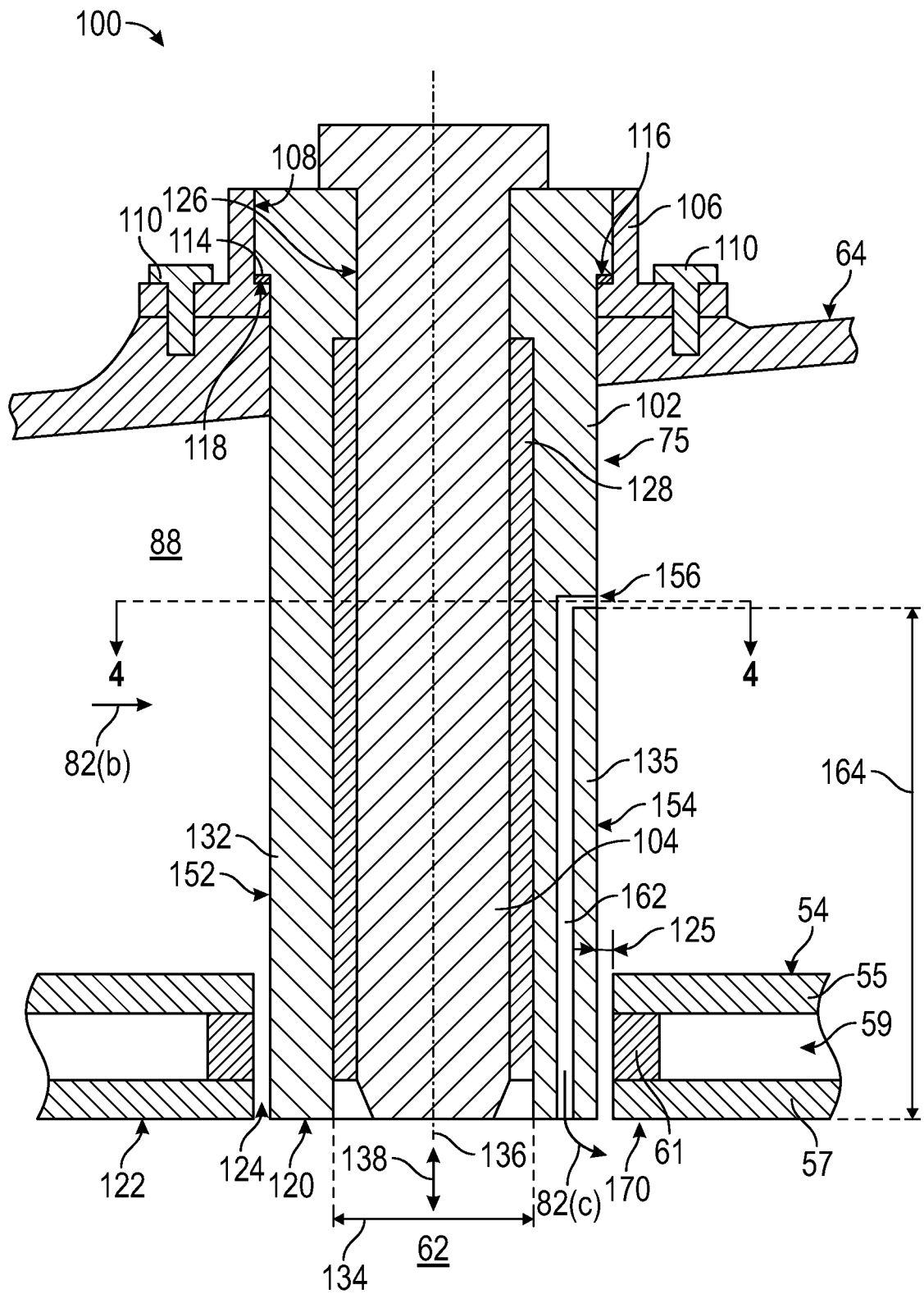
FIG. 3 is a partial cross-sectional view of an ignitor assembly taken at detail view 100 of FIG. 2, according to an aspect of the present disclosure.

FIG. 3 is a partial cross-sectional view of an exemplary ignitor assembly taken at detail view 100 of FIG. 2, according to an aspect of the present disclosure. In FIG. 3, the outer liner 54 is shown as a two-piece liner that includes an outer shell portion 55 and a heat shield panel portion 57, with a baffle cavity 59 therebetween. A grommet 61 may be provided between the outer shell portion 55 and the heat shield panel portion 57 at an ignitor opening 124 through the outer liner 54. The outer liner 54 is not limited to a two-piece liner and a single piece liner may be implemented instead. As shown in FIG. 3, the ignitor assembly 75 includes an ignitor housing 102 and an ignitor 104 disposed within the ignitor housing 102. The ignitor housing 102 may be configured to be coupled to the outer casing 64 via, for example, an adapter 106. For example, the ignitor housing 102 may include an external threaded portion 108 that threadedly engages with the adapter 106 so as to couple the ignitor housing 102 to the adapter 106. The adapter 106 may in turn be coupled to the outer casing 64 by, for example, being bolted to the outer casing 64 via bolts 110. Thus, the ignitor housing 102 is configured to be coupled to the outer casing 64 via the adapter 106. The ignitor 104 may be coupled to the ignitor housing 102 via, for example, an internal threaded portion 126 of the ignitor housing 102. An insulating layer 128 may be provided between the ignitor 104 and the ignitor housing 102. A shim 114 may be provided between a shoulder 116 of the ignitor housing 102 and a shoulder 118 of the adapter 106. The ignitor housing 102, when coupled to the outer casing 64, extends through the outer flow passage 88 and extends through the ignitor opening 124 through the outer liner 54 with a predetermined clearance 125 being provided between the ignitor housing 102 and the ignitor opening 124. The shim 114 may be provided to adjust an alignment of an inner end 120 of the ignitor housing 102 relative to a hot surface side 122 of the outer liner 54 (where the hot surface side 122 in FIG. 3 is a hot surface side of the heat shield panel portion 57 forming a part of the outer liner 54) so that the inner end 120 is arranged proximal to the hot surface side 122 of the outer liner 54. Here, proximal may mean flush with the hot surface side 122, or may mean within a given range from being flush with the hot surface side 122. As one example, when being assembled at standard atmospheric conditions (e.g., 68° F. and 1 atm pressure), the inner end 120 may be shimmed via the shim 114 so as to be arranged to be within a range of plus or minus ten millimeters of the hot surface side 122. Of course, other ranges could be implemented instead and the present disclosure is not limited to the foregoing range.

Figure 4:
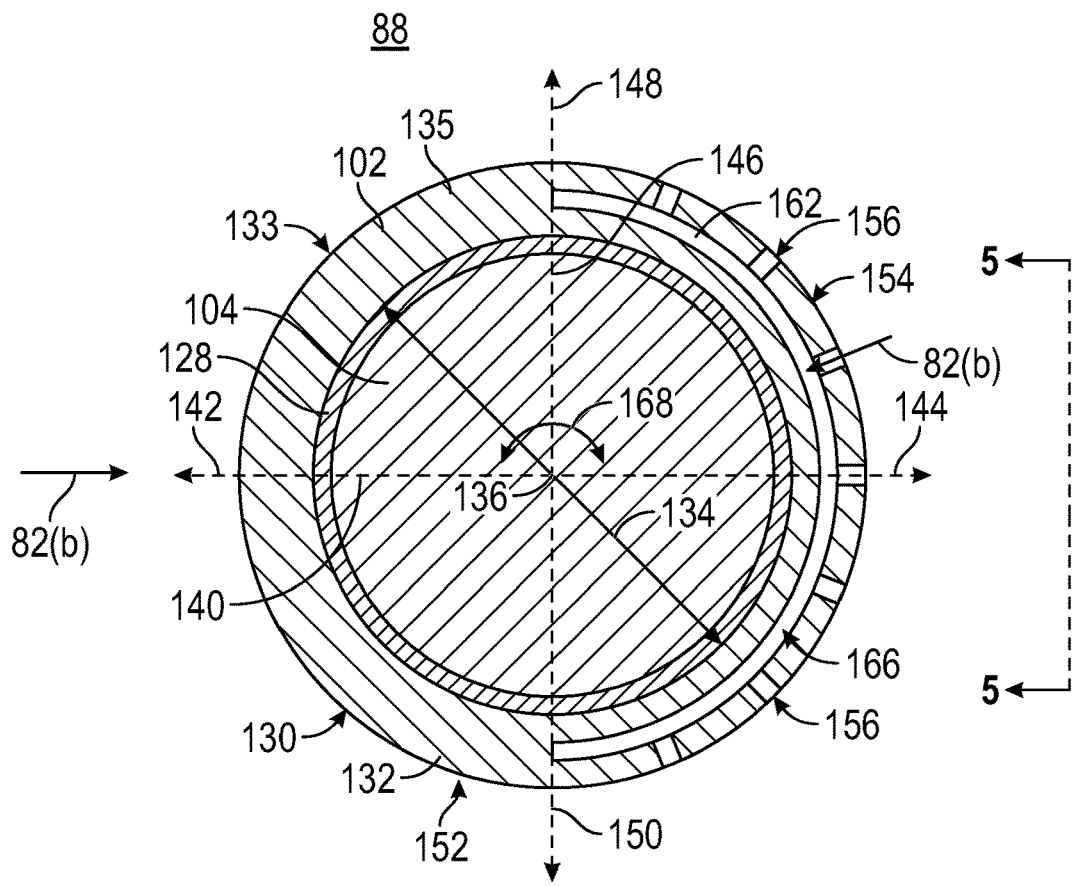
FIG. 4 is a cross-sectional view of the ignitor assembly taken at plane 4-4 of FIG. 3, according to an aspect of the present disclosure.

FIG. 4 is a cross-sectional view of the ignitor assembly taken at plane 4-4 of FIG. 3, according to an aspect of the present disclosure. Referring collectively to FIGS. 3 and 4, the ignitor housing 102 includes a housing wall 132 defining a perimeter 130. In FIG. 4, the housing wall 132 is seen to define a circular perimeter 133 and the housing wall 132 comprises a cylindrical housing wall 135 having an axial opening 134 therethrough extending along a centerline axis 136 of the cylindrical housing wall 135. The ignitor 104 is disposed within the axial opening 134. While the perimeter 130 is depicted in FIG. 4 as being the circular perimeter 133, and the housing wall 132 is depicted as the cylindrical housing wall 135, other perimeter shapes and housing wall shapes may be implemented instead of the circular perimeter and the cylindrical housing wall. The centerline axis 136 defines an axial direction 138 of the ignitor housing 102, while a flow axis 140 that extends orthogonal to the centerline axis 136 defines an upstream direction 142 and a downstream direction 144, and a lateral axis 146 that extends through the centerline axis 136 and extends orthogonal to the flow axis 140 defines a first lateral direction 148 and a second lateral direction 150. The flow axis 140 is generally parallel with the flow of compressed air 82(*b*) within the outer flow passage 88. The housing wall 132 includes a first side 152 (e.g., an upstream side) upstream of the centerline axis 136 and a second side 154 opposite the first side (e.g., a downstream side) downstream of the centerline axis 146.

Figure 5:
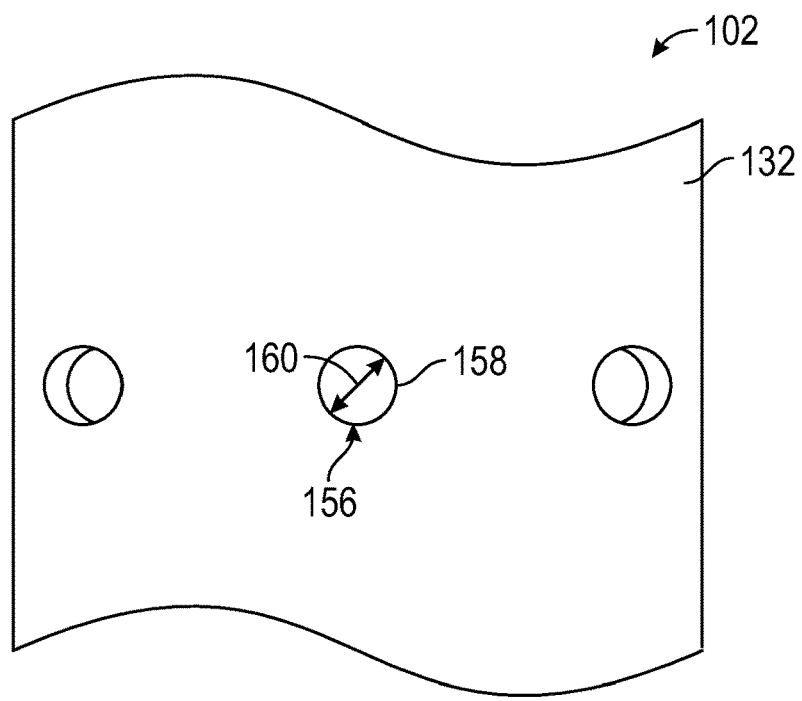
FIG. 5 is an aft forward-looking view of an ignitor housing taken at view 5-5 of FIG. 4, according to an aspect of the present disclosure.

The housing wall 132 includes at least one airflow inlet passage 156 on the second (downstream) side 154 of the housing wall 132. As shown in FIG. 4, the at least one airflow inlet passage 156 includes a plurality of airflow inlet passages 156 that are arranged within the outer flow passage 88 so that, as will be described below, a portion of the compressed air 82(*b*) flowing within the outer flow passage 88 can flow into the at least one airflow inlet passage 156. Referring briefly to FIG. 5, which is an aft forward-looking view taken at view 5-5 of FIG. 4, the at least one airflow inlet passage 156 is seen to comprise a circular inlet passage 158 extending through the housing wall 132. A diameter 160 of each of the airflow inlet passages 156, and a number of the airflow inlet passages 156 to be included in the housing wall 132, may be based on a desired amount of cooling airflow to be provided through the ignitor housing 102. While FIG. 5 depicts the inlet passage 156 as being the circular inlet passage 158, other shapes may be implemented for the inlet passage 156 and the inlet passage 156 is not limited to being a circular shape.

Referring back to FIGS. 3 and 4, the housing wall 132 also includes at least one cooling passage 162 on the second (downstream) side 154 within the housing wall 132. In FIG. 4, the at least one cooling passage 162 is seen to comprise a single cooling passage 162, but as will be described below, a plurality of cooling passages 162 may be included instead. The at least one cooling passage 162 extends along a length 164 of the ignitor housing 102 from the at least one airflow inlet passage 156 and through the inner end 120 of the ignitor housing 102 such that the at least one cooling passage 162 is in fluid communication with the at least one airflow inlet passage 156 and with the combustion chamber 62. The at least one cooling passage 162 of FIG. 4 is shown as a slotted cooling passage 166 extending in a circumferential direction 168 on the second (downstream) side 154 of the housing wall 132 with respect to the centerline axis 136 of the housing wall 132. The slotted cooling passage 166 is considered to be slotted in that it is an opening having a slot width and a slot length as seen in the cross-sectional view of FIG. 4, where the slot width may be taken with respect to the flow axis 140 and the slot length may be taken as a radial length (or arc length) with respect to a center point of the slot width about the centerline axis 136. FIG. 4 depicts the slotted cooling passage 166 having a length extending one-hundred-eighty degrees on the second (downstream) side 154 of the housing wall 132 with respect to the lateral axis 146 and the downstream direction 144 of the flow axis 140. However, the slotted cooling passage 166 may extend less than one-hundred-eighty degrees on the second (downstream) side 154 of the housing wall 132, such as extending one-hundred-twenty degrees (e.g., extending sixty degrees from the downstream direction 144 of the flow axis 140 and toward the first lateral direction 148 of the lateral axis 146, and extending sixty degrees from the downstream direction 144 of the flow axis 140 toward the second lateral direction 150 of the lateral axis 146). Alternatively, the slotted cooling passage 166 may extend more than one-hundred-eighty degrees (e.g., extending one-hundred-twenty degrees from the downstream direction 144 of the flow axis 140 and toward the first lateral direction 148 of the lateral axis 146, and extending one-hundred-twenty degrees from the downstream direction 144 of the flow axis 140 toward the second lateral direction 150 of the lateral axis 146).

In operation, as was described above with regard to FIGS. 1 and 2, a portion of the compressed air 82 within the diffuser cavity 84, shown schematically with arrow 82(b), flows into the outer flow passage 88. In FIGS. 3 and 4, a portion of the compressed air 82(b) within the outer flow passage 88 passes through the at least one airflow inlet passage 156 and then into the at least one cooling passage 162. A cooling airflow 82(c) flows from the at least one cooling passage 162 at the inner end 120 of the ignitor housing 102 to provide cooling to a downstream side 170 of the ignitor opening 124 at the hot surface side 122 the outer liner 54.

Figure 6:
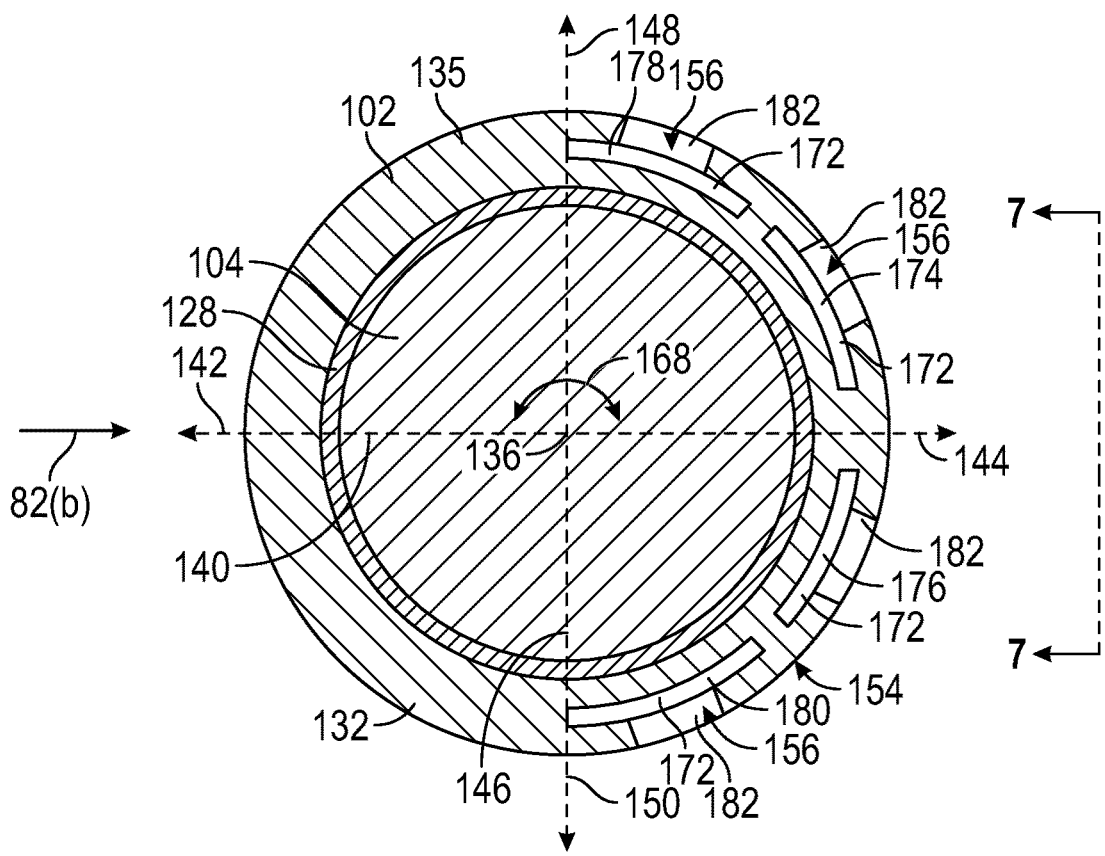
FIG. 6 is a cross-sectional view of an alternative arrangement to that shown in FIG. 4, according to another aspect of the present disclosure.
Figure 7:
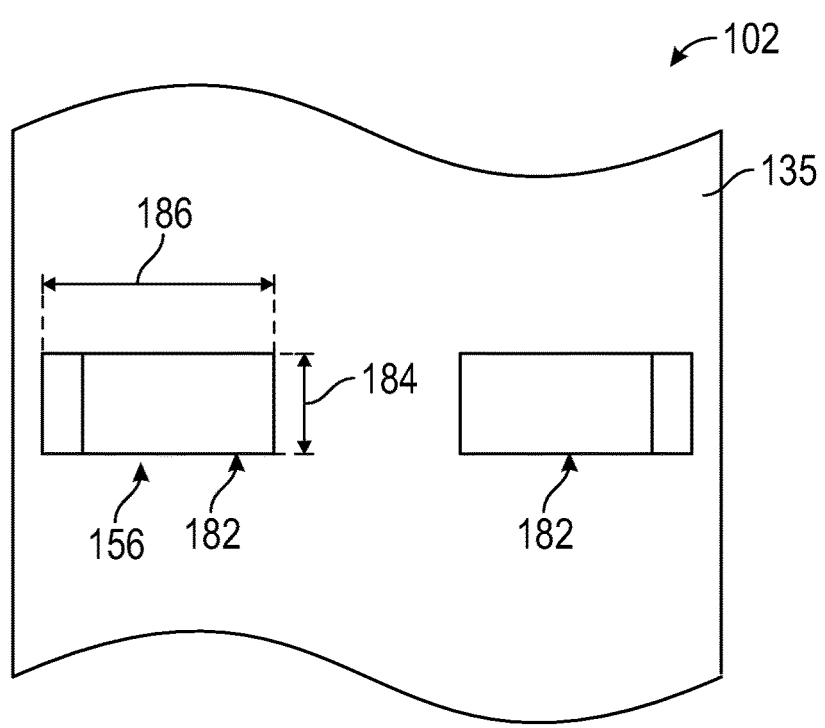
FIG. 7 is an aft forward-looking view of an ignitor housing taken at view 7-7 of FIG. 6, according to an aspect of the present disclosure.

FIG. 6 is a cross-sectional view of an alternative arrangement to that shown in FIG. 4, according to another aspect of the present disclosure. In the FIG. 6 aspect, rather than a single cooling passage 162, the ignitor housing 102 is seen to include a plurality of cooling passages 172. Each of the plurality of cooling passages 172 may be similar to the cooling passage 162 in that they may be a slotted cooling passage extending along the length 164 of the second (downstream) side 154 of the cylindrical housing wall 135. The plurality of cooling passages 172 in FIG. 6 may include a first slotted cooling passage 174 extending in the circumferential direction 168 at least partially between the downstream direction 144 of the flow axis 140 and the first lateral direction 148 of the lateral axis 146, and a second slotted cooling passage 176 extending in the circumferential direction 168 at least partially between the downstream direction 144 of the flow axis 140 and the second lateral direction 150 of the lateral axis 146. Similarly, the FIG. 6 aspect may include a third slotted cooling passage 178 extending in the circumferential direction 168 at least partially between the downstream direction 144 of the flow axis 140 and the first lateral direction 148 of the lateral axis 146, and a fourth slotted cooling passage 180 extending in the circumferential direction 168 at least partially between the downstream direction 144 of the flow axis 140 and the second lateral direction 150 of the lateral axis 146. In addition, in FIG. 6, each of the plurality of cooling passages 172 is seen to include a respective airflow inlet passage 156. Referring to FIG. 7, which is an aft forward-looking view of the ignitor housing 102 taken at view 7-7 of FIG. 6, each of the airflow inlet passages 156 is seen to be a slotted inlet passage 182 having a slot height 184 and a slot width 186. The slot height 184 and the slot width 186, like the diameter 160 of the circular inlet passages 158 (FIG. 5), may be sized based on a desired amount of airflow to be provided through the slotted cooling passages 172. While FIG. 6 depicts four slotted cooling passages 172, more than four slotted cooling passages 172 may be included instead. In addition, fewer than four slotted cooling passages 172 may be included. For example, the first slotted cooling passage 174 and the third slotted cooling passage 178 may be formed to define a single slotted cooling passage, and the second slotted cooling passage 176 and the fourth slotted cooling passage 180 may also be formed to define a single slotted cooling passage.

Figure 8:
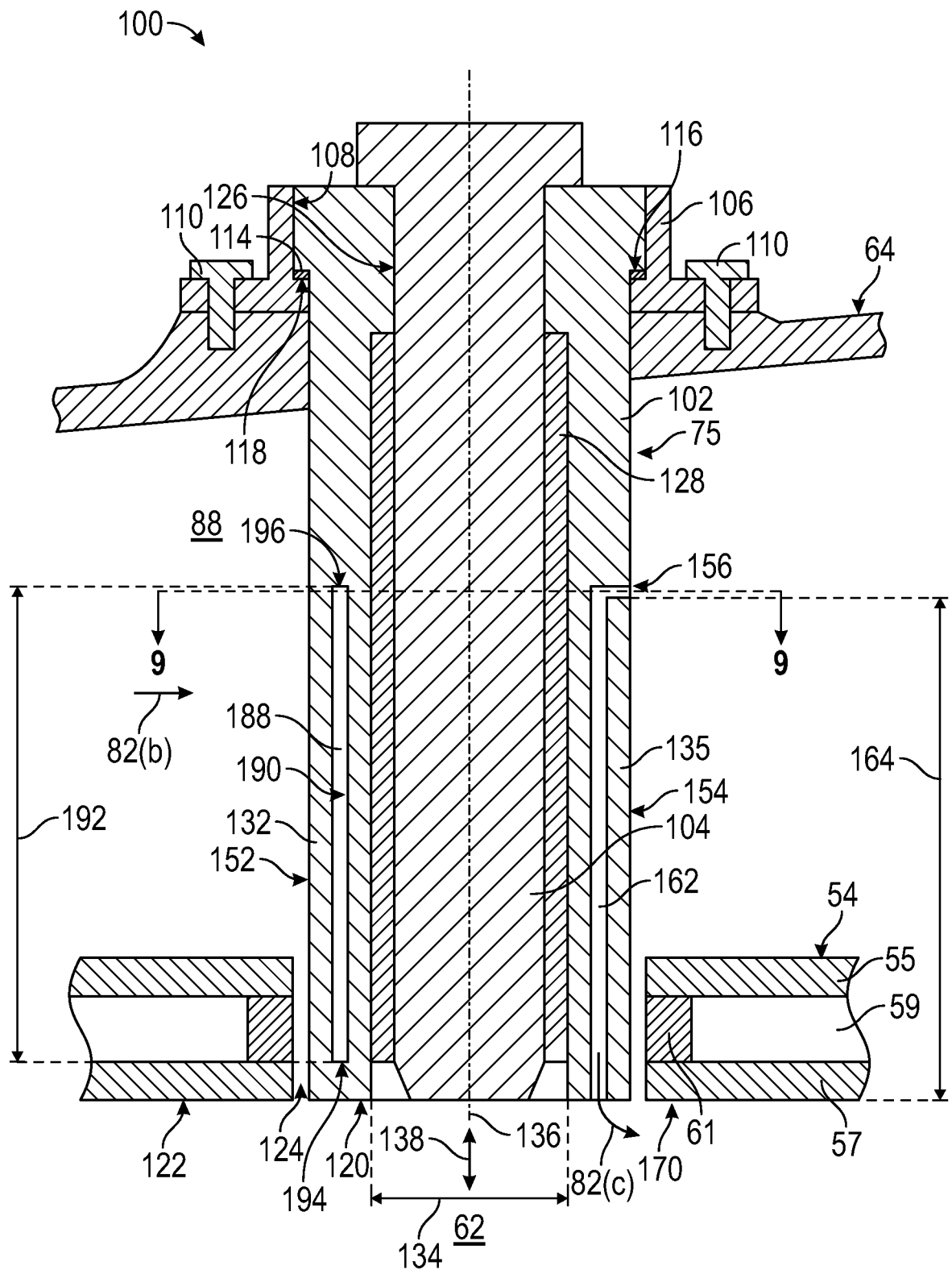
FIG. 8 is a partial cross-sectional view of an alternate ignitor assembly similar to that of FIG. 3, according to another aspect of the present disclosure.
Figure 9:
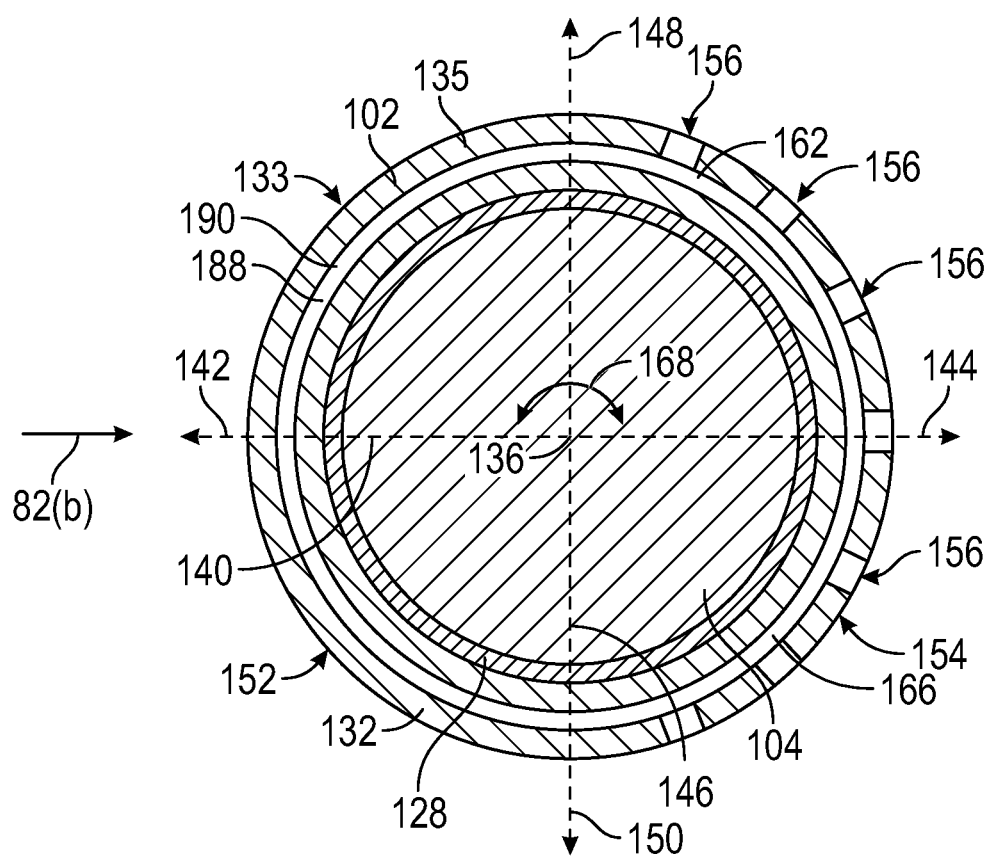
FIG. 9 is a cross-sectional view of the alternate ignitor assembly taken at plane 9-9 of FIG. 8, according to an aspect of the present disclosure.

FIG. 8 is a partial cross-sectional view of an alternate ignitor assembly similar to that of FIG. 3, according to another aspect of the present disclosure. FIG. 9 is a cross-sectional view of the alternate ignitor assembly taken at plane 9-9 of FIG. 8, according to an aspect of the present disclosure. Referring collectively to FIGS. 8 and 9, the second (downstream) side 154 of the ignitor housing 102 is similar to that of FIGS. 3 and 4 in that the second (downstream) side 154 includes the airflow inlet passages 156, and the cooling passage 162, where the airflow inlet passages 156 are defined as the circular inlet passage 158 (FIG. 5) and the cooling passage 162 is defined as the slotted cooling passage 166. However, in the aspect of FIGS. 8 and 9, the first (upstream) side 152 of the cylindrical housing wall 135 includes at least one upstream cavity 188. The upstream cavity 188 may be similar to the slotted cooling passage 166, and may itself be a slotted upstream cavity 190. The at least one upstream cavity 188 is in fluid communication with the slotted cooling passage 166. That is, the upstream cavity 188 can receive airflow from the slotted cooling passage 166 and can provide a return airflow to the slotted cooling passage 166.

The slotted upstream cavity 190 extends in the circumferential direction 168 within the housing wall 132 and, as shown in FIGS. 8 and 9, extends between the first lateral direction 148 and the second lateral direction 150. In addition, the slotted upstream cavity 190 extends in the axial direction 138 along an axial length 192 of the housing wall 132 from a first end 194 of the slotted upstream cavity 190 to a second end 196 of the slotted upstream cavity 190. The first end 194 of the slotted upstream cavity 190 and the second end 196 of the slotted upstream cavity 190 are defined within the housing wall 132, thereby defining a closed upstream cavity. Here, the term "closed cavity" may mean that the slotted upstream cavity may receive a flow of cooling air from the slotted cooling passage 166 and may provide a return flow of the cooling air to the slotted cooling passage 166, but the slotted upstream cavity 190 is closed axially at the first end 194 and closed at the second end 196 so that a flow of the cooling air within the slotted upstream cavity 190 is not provided through the inner end 120 of the ignitor housing 102. The first end 194 may be provided proximal to the inner end 120. Here, in this embodiment, proximal means the first end 194 is not flush with the inner end 120, but is within a range of twenty-five millimeters to fifty millimeters of the inner end 120 of the ignitor housing 102. Of course, the first end 194 may be provided within other ranges of the inner end 120 and the present disclosure is not limited to the foregoing range.

Figure 10:
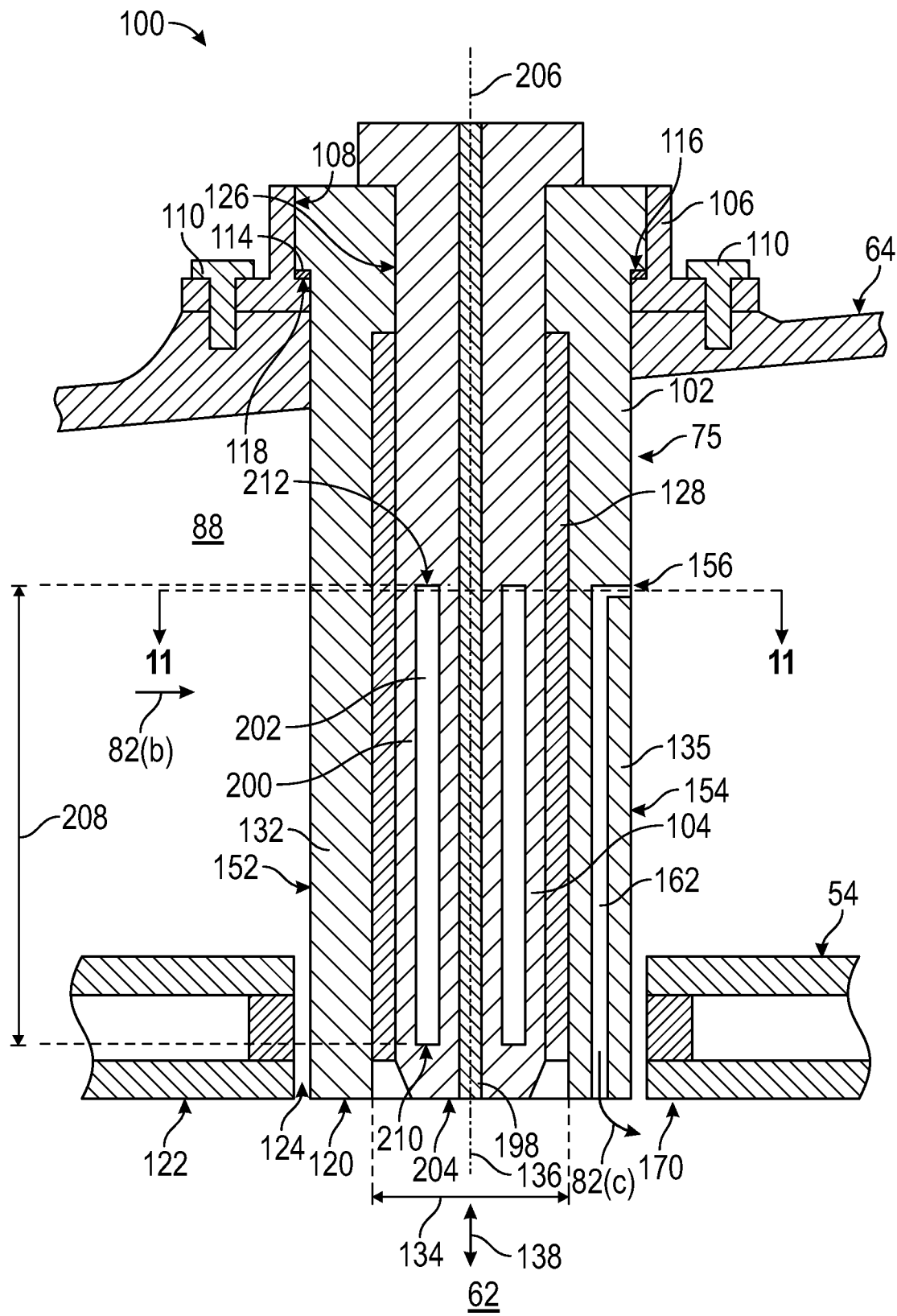
FIG. 10 is a partial cross-sectional view of an alternate ignitor assembly similar to that of FIG. 3, according to another aspect of the present disclosure.
Figure 11:
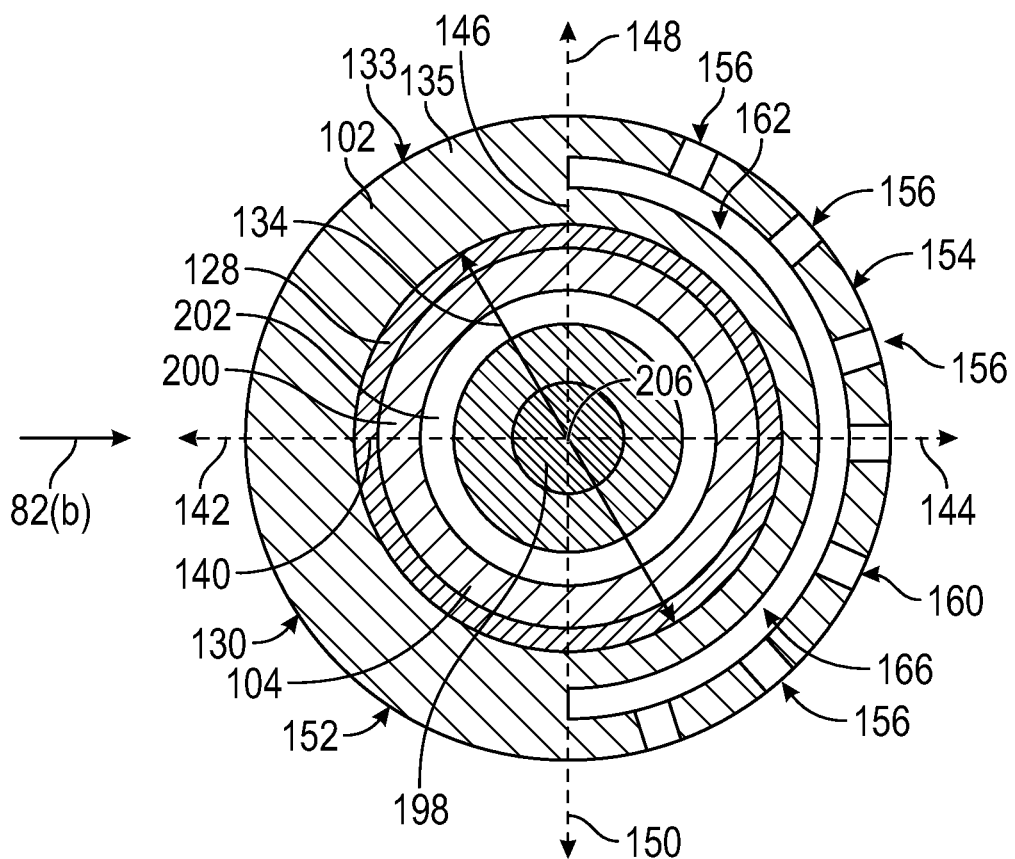
FIG. 11 is a cross-sectional view of the alternate ignitor assembly taken at plane 11-11 of FIG. 10, according to an aspect of the present disclosure.

FIG. 10 is a partial cross-sectional view of an alternate ignitor assembly similar to that of FIG. 3, according to another aspect of the present disclosure. FIG. 11 is a cross-sectional view of the alternate ignitor assembly taken at plane 11-11 of FIG. 10, according to an aspect of the present disclosure. Referring collectively to FIGS. 10 and 11, the ignitor housing 102 is similar to that of FIGS. 3 and 4 and the description of the ignitor housing 102 for those figures is applicable to the ignitor housing 102 of FIGS. 10 and 11. In FIGS. 10 and 11, however, additional details of the ignitor 104 are included. The ignitor 104 is seen to include an electrode 198 that extends through a shaft portion 200 that is arranged within the ignitor housing 102. The electrode 198 may be surrounded by an insulator (not shown) between the electrode and the shaft portion 200, and may be coupled to an ignition source (not shown) to provide an electrical charge to the electrode 198. The shaft portion 200 has a first end 204 arranged proximal to the inner end 120 of the ignitor housing 102. For this particular embodiment, proximal may mean flush with the inner end 120, or within a given range (e.g., plus or minus ten millimeters) from being flush with the inner end 120 of the ignitor housing 102. The shaft portion 200 also includes a hollow closed insulation cavity 202 therewithin. The hollow closed insulation cavity 202 is a closed cavity without an inlet or an outlet for airflow and is arranged as an insulator for the ignitor electrode 198. The hollow closed insulation cavity 202 extends circumferentially about a centerline axis 206 of the shaft portion 200. The hollow closed insulation cavity 202 has an axial length 208 extending in the axial direction 138 with respect to the centerline axis 206 of the shaft portion 200 from a first end 210 of the hollow closed insulation cavity 202 to a second end 212 of the hollow closed insulation cavity 202. The first end 210 of the hollow closed insulation cavity 202 may be arranged proximal to the first end 204 of the shaft portion 200, or within a given range. The second end 212 of the hollow closed insulation cavity 202 may be arranged such that, when the ignitor 104 is disposed within the ignitor housing 102 with the first end 204 of the ignitor 104 being proximal to the inner end 120 of the ignitor housing 102, the second end 212 is arranged proximal to the at least one airflow inlet passage 156 of the ignitor housing 102. Alternatively, the second end 212 of the hollow closed insulation cavity 202 may extend outward beyond the airflow inlet passage 156 along the centerline axis 206 towards the outer casing 64.

Figure 12:
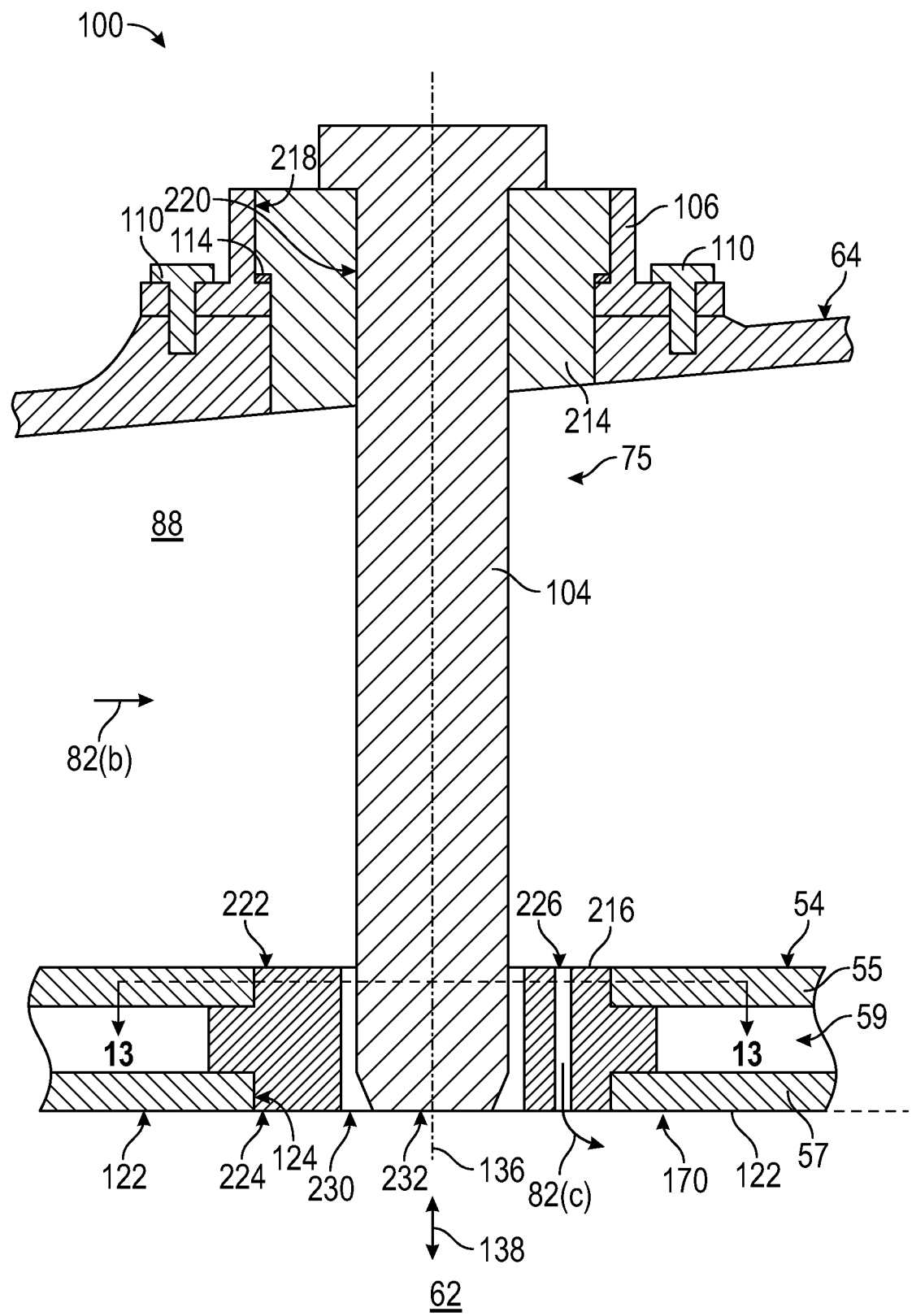
FIG. 12 is a partial cross-sectional view of an alternate ignitor assembly, according to another aspect of the present disclosure.
Figure 13:
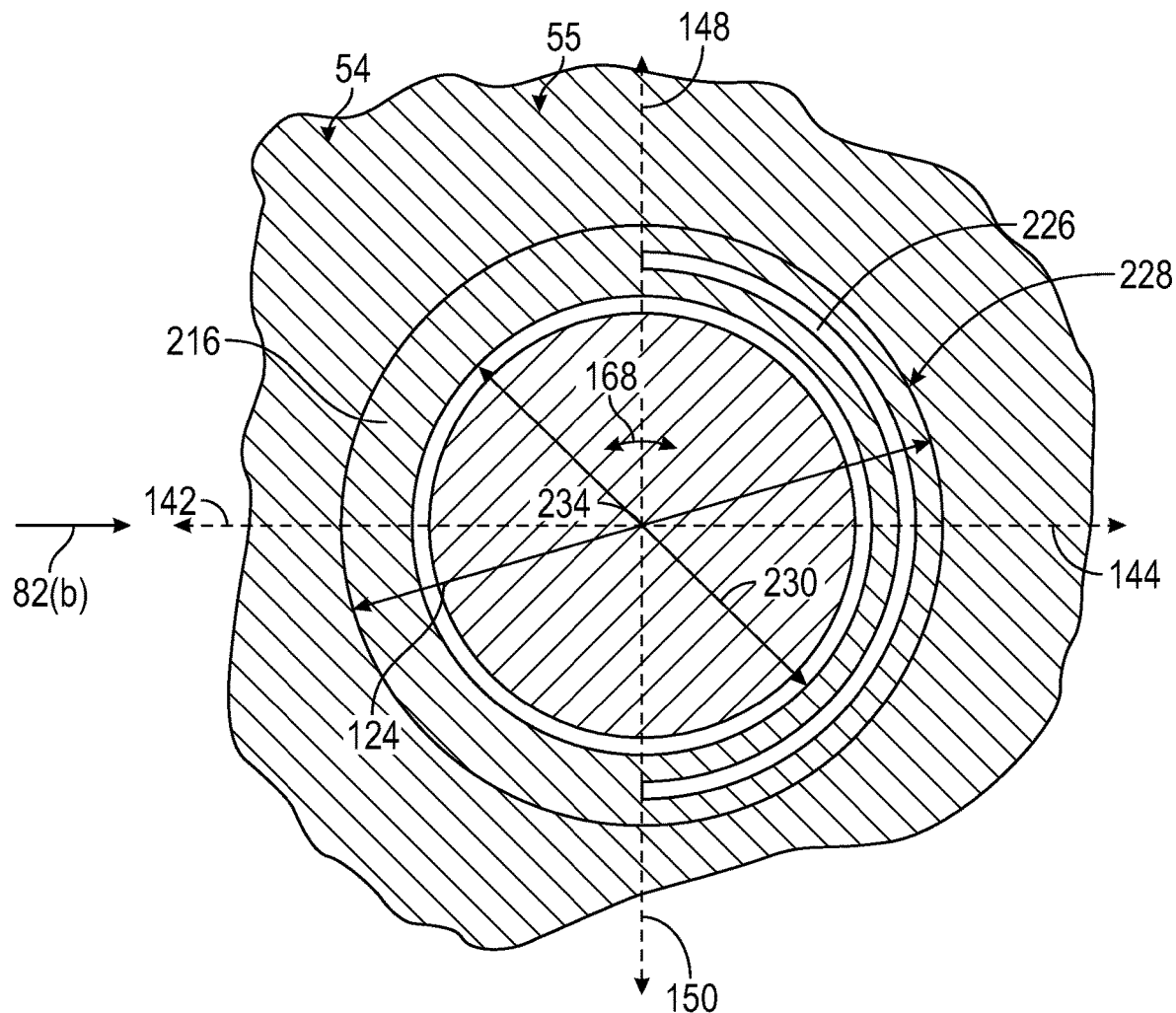
FIG. 13 is a cross-sectional view of the alternate ignitor assembly taken at plane 13-13 of FIG. 12, according to an aspect of the present disclosure.

FIG. 12 is a partial cross-sectional view of an alternate ignitor assembly, according to another aspect of the present disclosure. FIG. 13 is a cross-sectional view of the alternate ignitor assembly taken at plane 13-13 of FIG. 12, according to an aspect of the present disclosure. In the aspect of FIGS. 12 and 13, rather than including the ignitor housing 102, the ignitor assembly 75 includes an ignitor mounting adapter 214 to which the ignitor 104 is installed, and an ignitor grommet 216 is provided through the ignitor opening 124 of the outer liner 54, where the ignitor 104 extends through the ignitor grommet 216. The ignitor mounting adapter 214 may be coupled to the adapter 106 via an outer threaded portion 218, similar to the coupling of the ignitor housing 102 to the adapter 106 as described with regard to FIG. 3. The ignitor 104 may be coupled to the ignitor mounting adapter 214 via an internal threaded portion 220 of the ignitor mounting adapter 214, similar to the ignitor 104 being coupled to the ignitor housing 102 of FIG. 3.

The ignitor grommet 216 includes a cold surface side 222 and a hot surface side 224. A cooling passage 226, which is similar to the slotted cooling passage 166 of FIG. 3, is arranged on a downstream side 228 of the ignitor grommet 216 and extends through the ignitor grommet 216 from the cold surface side 222 to the hot surface side 224. The cooling passage 226 extends in the circumferential direction 168 about a centerline axis 234 of the ignitor grommet 216. The ignitor grommet 216 includes an ignitor opening 230 extending therethrough, and the ignitor 104 extends through the ignitor opening 230. The shim 114 is implemented similar to the FIG. 3 aspect so as to adjust an alignment of an inner end 232 of the ignitor 104 relative to the hot surface side 224 of the ignitor grommet 216 so that the inner end 232 is arranged proximal to the hot surface side 224. In this embodiment, proximal means flush with the hot surface 224, or within a range of plus or minus ten millimeters of being flush with the hot surface side 224 of the hot surface side 224. Of course, other ranges could be implemented in instead and the present embodiment is not limited to the foregoing range. Thus, with the arrangement of FIGS. 12 and 13, the cooling passage 226 provides for a flow of the cooling airflow 82(c) to flow therethrough so as to provide cooling to the downstream side 170 of the ignitor opening 124 at the hot surface side 122 of the outer liner 54.

Figure 14:
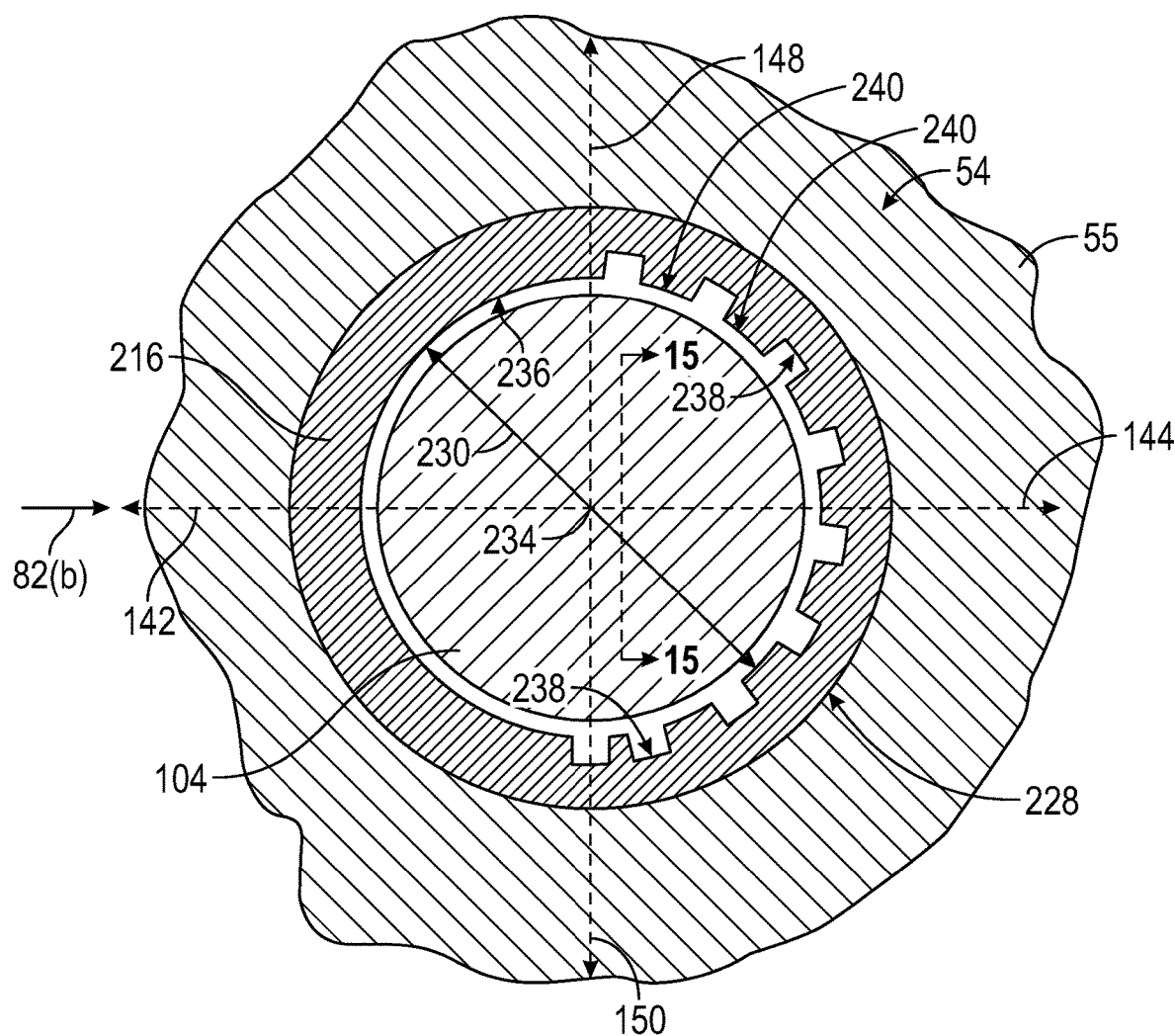
FIG. 14 is a cross-sectional view of the alternate ignitor grommet arrangement of that depicted in FIG. 13, according to an aspect of the present disclosure.
Figure 15:
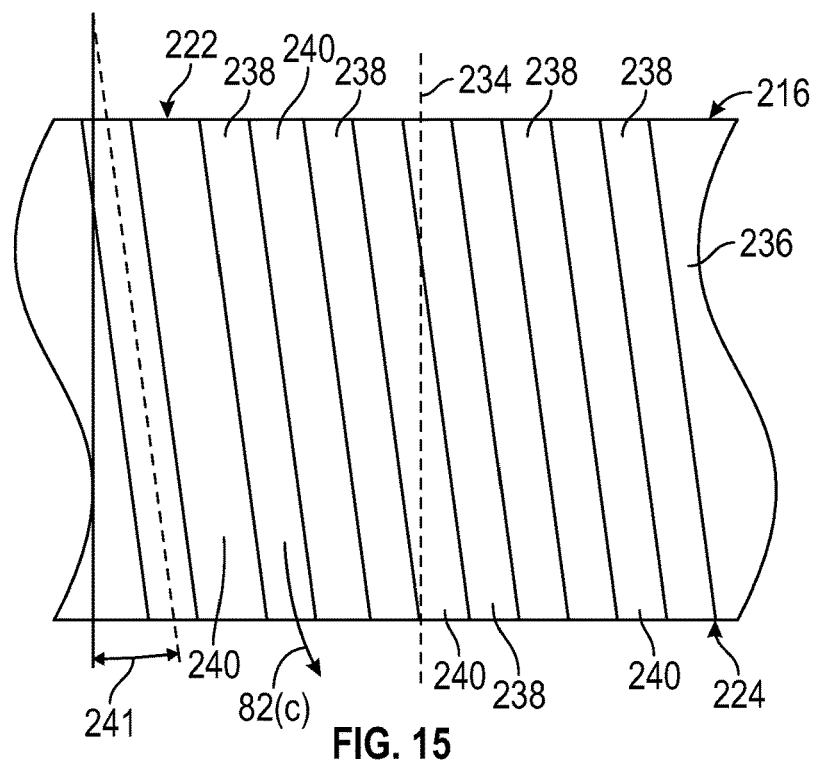
FIG. 15 is an aft-looking view of a cylindrical wall taken at view 15-15 of FIG. 14, with the ignitor removed, according to an aspect of the present disclosure.

FIG. 14 is a cross-sectional view of an alternate ignitor grommet arrangement to that depicted in FIG. 13, according to an aspect of the present disclosure. In the FIG. 14 arrangement, the ignitor grommet 216 includes the ignitor opening 230, which is a cylindrical wall 236 extending circumferentially about the centerline axis 234 of the ignitor grommet 216 and extending from the cold surface side 222 (FIG. 12) of the ignitor grommet 216 to the hot surface side 224 (FIG. 12) of the ignitor grommet 216. On the downstream side 228 of the ignitor grommet 216, the cylindrical wall 236 includes a plurality of grooves 238 that define a plurality of swirl vanes 240 between respective ones of the grooves 238. That is, ridges formed between respective ones of the grooves 238 form a swirl vane 240. FIG. 15 is an aft-looking view of the cylindrical wall 236 taken at view 15-15 of FIG. 14, with the ignitor 104 removed. As shown in FIG. 15, each of the plurality of grooves 238, and the plurality of swirl vanes 240, extends from the cold surface side 222 to the hot surface side 224 of the ignitor grommet 216. The swirl vanes 240 may be arranged at a swirl vane angle 241 with respect to the centerline axis 234 of the ignitor grommet 216. While the swirl vanes 240 and grooves 238 depicted in FIG. 15 may appear to be linear, the grooves 238 and the swirl vanes 240 may be curved or helical so as to be formed similar to a rifling groove. Thus, a portion of the compressed air 82(b) (FIG. 14) flowing in the outer flow passage 88 (FIG. 2) can be provided through the ignitor opening 230 (FIG. 14) and a swirl can be induced by the swirl vanes 240 into the cooling airflow 82(c) passing through the ignitor opening 230.

Figure 16:
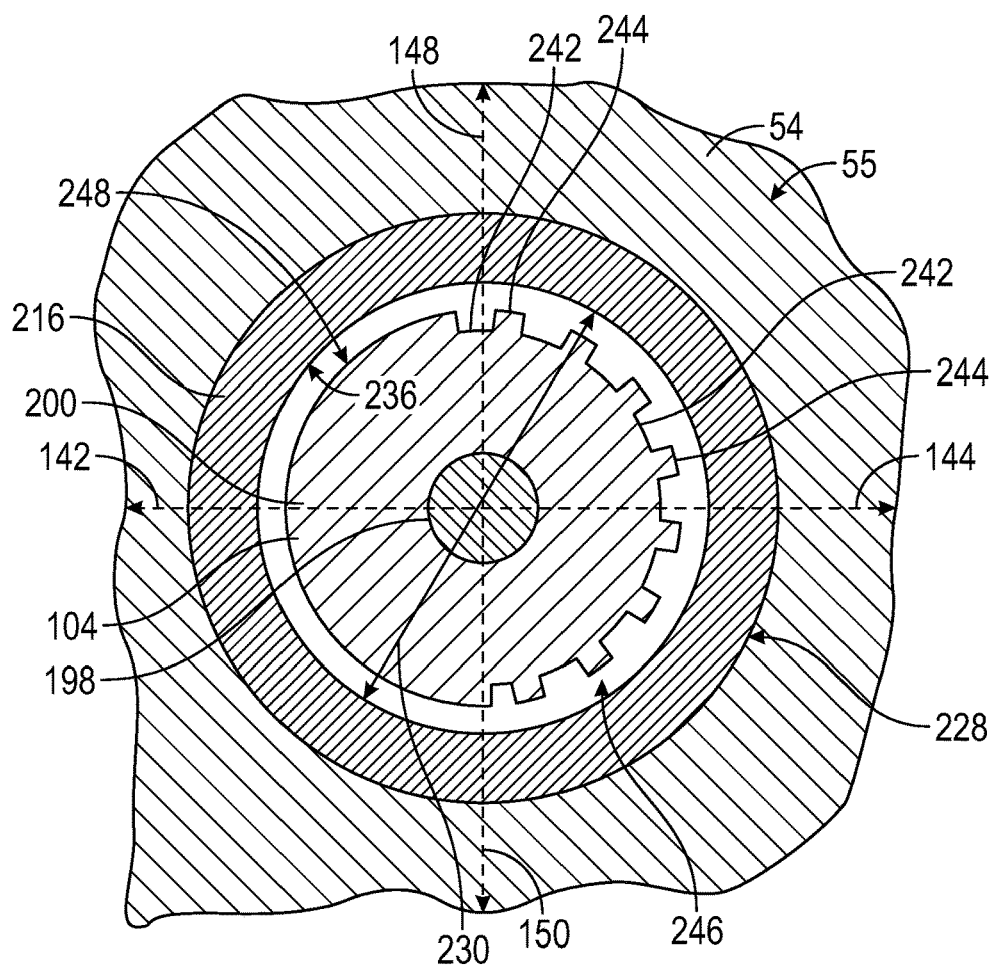
FIG. 16 is a cross-sectional view of the alternate ignitor arrangement of FIG. 14, according to an aspect of the present disclosure.

FIG. 16 is a cross-sectional view of another alternate ignitor grommet arrangement, according to another aspect of the present disclosure. In FIG. 16, the cylindrical wall 236 of the ignitor grommet 216 is seen to not include the plurality of grooves 238 and the plurality of swirl vanes 240. Instead, swirl vanes are provided in the shaft portion 200 of the ignitor 104. As shown in FIG. 16, an outer surface 248 of the shaft portion 200, on a downstream side 246 of the shaft portion 200, includes a plurality of grooves 242 that define a plurality of swirl vanes 244. Each of the swirl vanes 244 may be arranged similar to the swirl vanes 240 (FIG. 15) at the swirl vane angle 241. Additionally, the grooves 242 and swirl vanes 244 may extend along an axial length of the shaft portion 200 from the inner end 232 (FIG. 12) of the ignitor 104 and beyond the cold surface side 222 of the ignitor grommet 216 into the outer flow passage 88. Thus, the swirl vanes 244 in the shaft portion 200 can induce a swirl into the flow of cooling airflow 82(c) passing through the ignitor opening 230.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

The foregoing aspects of the present disclosure provide for a flow of cooling air on a downstream side of the ignitor opening to cool the hot surface side of the liner. As a result, the durability of the liner can be improved.

Further aspects of the present disclosure are provided by the subject matter of the following clauses.

A combustor for a gas turbine, the combustor including a combustor liner defining a combustion chamber, an outer casing surrounding the combustor liner and defining an outer flow passage therebetween, an ignitor housing extending through an ignitor opening through the combustor liner and extending through the outer flow passage, the ignitor housing having an inner end arranged at a hot surface side of the combustor liner adjacent to the combustion chamber, and an ignitor disposed within the ignitor housing, wherein the ignitor housing includes a housing wall defining a perimeter of the ignitor housing, the housing wall having an upstream side and a downstream side opposite the upstream side, and the housing wall including (a) at least one airflow inlet passage on the downstream side of the housing wall and arranged within the outer flow passage, and (b) at least one cooling passage on the downstream side within the housing wall, the at least one cooling passage extending along a length of the ignitor housing from the at least one airflow inlet passage and through the inner end of the ignitor housing, the at least one cooling airflow passage being in fluid communication with the at least one airflow inlet passage.

The combustor according to the preceding clause, further comprising an insulating layer disposed between the ignitor housing and the ignitor.

The combustor according to any preceding clause, wherein the at least one cooling passage is arranged to provide a flow of cooling air to a hot surface side of the combustor liner at a downstream side of the ignitor opening.

The combustor according to any preceding clause, wherein the ignitor housing is coupled to the outer casing, and the ignitor housing extends through the ignitor opening through the combustor liner with a predetermined clearance therebetween.

The combustor according to any preceding clause, wherein the perimeter of the ignitor housing defines a circular perimeter and the ignitor housing comprises a cylindrical housing wall, the cylindrical housing wall having an axial opening therethrough extending along a centerline axis of the cylindrical housing wall, the ignitor being disposed within the axial opening.

The combustor according to any preceding clause, wherein the at least one airflow inlet passage comprises a plurality of inlet passages through the housing wall and providing fluid communication between the outer flow passage and the at least one cooling passage.

The combustor according to any preceding clause, wherein the at least one cooling passage comprises at least one slotted cooling passage extending in a circumferential direction on the downstream side within the housing wall with respect to the centerline axis of the housing wall.

The combustor according to any preceding clause, wherein the centerline axis defines an axial direction, a flow axis of the cylindrical housing wall extends orthogonal to the centerline axis and defines an upstream direction and a downstream direction, and a lateral axis of the cylindrical housing wall extends through the centerline axis and extends orthogonal to the flow axis and defines a first lateral direction and a second lateral direction, the at least one slotted cooling passage extending between the first lateral direction of the lateral axis and the second lateral direction of the lateral axis.

The combustor according to any preceding clause, wherein the at least one slotted cooling passage comprises a first slotted cooling passage extending in the circumferential direction between the downstream direction and the first lateral direction, and a second slotted cooling passage extending between the downstream direction and the second lateral direction.

The combustor according to any preceding clause, wherein the housing wall further includes at least one upstream cavity in the upstream side of the housing wall, the at least one upstream cavity being in fluid communication with the at least one slotted cooling passage.

The combustor according to any preceding clause, wherein the at least one upstream cavity is a slotted upstream cavity extending in the circumferential direction and extends between the first lateral direction and the second lateral direction.

The combustor according to any preceding clause, wherein the at least one upstream cavity extends in the axial direction along an axial length of the housing wall from a first end of the at least one upstream cavity to a second end of the at least one upstream cavity, the first end of the at least one upstream cavity and the second end of the at least one upstream cavity being defined within the housing wall.

The combustor according to any preceding clause, wherein the ignitor includes a shaft portion arranged within the ignitor housing, the shaft portion having a first end arranged proximal to the inner end of the ignitor housing, and the shaft portion including a hollow closed insulation cavity therewithin.

The combustor according to any preceding clause, wherein the hollow closed insulation cavity extends circumferentially about a centerline axis of the shaft portion, and has an axial length extending in an axial direction with respect to the centerline axis of the shaft portion from a first end of the hollow closed insulation cavity to a second end of the hollow closed insulation cavity.

The combustor according to any preceding clause, wherein the first end of the hollow closed insulation cavity is arranged proximal to the first end of the shaft portion and the second end of the hollow closed insulation cavity is arranged such that, when the ignitor is disposed within the ignitor housing with the first end of the shaft portion proximal to the inner end of the ignitor housing, the second end is arranged proximal to the at least one airflow inlet passage of the ignitor housing.

The combustor according to any preceding clause, wherein the combustor liner comprises an outer liner extending circumferentially about a combustor centerline axis, and an inner liner extending circumferentially about the combustor centerline axis, the combustion chamber being defined between the outer liner and the inner liner, and the outer casing surrounds the outer liner and defines the outer flow passage between the outer casing and the outer liner, and the ignitor housing extends through the outer liner and extends through the outer flow passage.

The combustor according to any preceding clause, wherein the outer liner comprises an outer shell and a heat shield panel connected with the outer shell to define a baffle cavity therebetween, and the hot surface side of the combustor liner comprising a hot surface side of the heat shield panel.

A gas turbine including a compressor section, and a combustor, the compressor section providing a flow of compressed air to the combustor, the combustor including a combustor liner defining a combustion chamber, at least one swirler assembly providing a flow of the compressed air and a fuel as a fuel-air mixture to the combustion chamber, an outer casing surrounding the combustor liner and defining an outer flow passage therebetween, at least a portion of the flow of compressed air being routed through the outer flow passage, an ignitor housing extending through an ignitor opening through the combustor liner and extending through the outer flow passage, the ignitor housing having an inner end arranged at a hot surface side of the combustor liner adjacent to the combustion chamber, and an ignitor disposed within the ignitor housing to ignite the fuel-air mixture, wherein the ignitor housing includes a housing wall defining a perimeter of the ignitor housing, the housing wall having an upstream side and a downstream side opposite the first side, and the housing wall including (a) at least one airflow inlet passage on the downstream side of the housing wall and arranged within the outer flow passage, and (b) at least one cooling passage on the downstream side within the housing wall, the at least one cooling passage extending along a length of the ignitor housing from the at least one airflow inlet passage and through the inner end of the ignitor housing, the at least one cooling passage being in fluid communication with the at least one airflow inlet passage.

The gas turbine according to the preceding clause, wherein the ignitor operates to ignite the fuel-air mixture within the combustion chamber, and the at least one cooling passage in the ignitor housing provides a flow of the compressed air from the outer flow passage therethrough to provide a cooling airflow to a downstream side of the ignitor opening through the combustor liner at the hot surface side of the combustor liner.

The gas turbine according to any preceding clause, wherein the ignitor housing includes cylindrical housing wall, the at least one cooling passage comprises at least one slotted cooling passage extending in a circumferential direction on the downstream side within the cylindrical housing wall, the cylindrical housing wall further including at least one upstream cavity in the upstream side of the housing wall, the at least one upstream cavity being in fluid communication with the at least one slotted cooling passage and providing impingement cooling to an upstream side of the ignitor housing.

The gas turbine according to the preceding clause, further comprising an insulating layer disposed between the ignitor housing and the ignitor.

The gas turbine according to any preceding clause, wherein the at least one cooling passage is arranged to provide a flow of cooling air to a hot surface side of the combustor liner at a downstream side of the ignitor opening.

The gas turbine according to any preceding clause, wherein the ignitor housing is configured to be coupled to the outer casing, and the ignitor housing extends through the ignitor opening through the combustor liner with a predetermined clearance therebetween.

The gas turbine according to any preceding clause, wherein the perimeter of the ignitor housing defines a circular perimeter and the ignitor housing comprises a cylindrical housing wall, the cylindrical housing wall having an axial opening therethrough extending along a centerline axis of the cylindrical housing wall, the ignitor being disposed within the axial opening.

The gas turbine according to any preceding clause, wherein the at least one airflow inlet passage comprises a plurality of inlet passages through the cylindrical housing wall and providing fluid communication between the outer flow passage and the at least one cooling passage.

The gas turbine according to any preceding clause, wherein the at least one cooling passage comprises at least one slotted cooling passage extending in a circumferential direction on the second side within the housing wall with respect to the centerline axis of the housing wall.

The gas turbine according to any preceding clause, wherein the centerline axis defines an axial direction, a flow axis of the cylindrical housing wall extends orthogonal to the centerline axis and defines an upstream direction and a downstream direction, and a lateral axis of the cylindrical housing wall extends through the centerline axis and extends orthogonal to the flow axis and defines a first lateral direction and a second lateral direction, the at least one slotted cooling passage extending between the first lateral direction of the lateral axis and the second lateral direction of the lateral axis.

The gas turbine according to any preceding clause, wherein the at least one slotted cooling passage comprises a first slotted cooling passage extending in the circumferential direction between the downstream direction and the first lateral direction, and a second slotted cooling passage extending between the downstream direction and the second lateral direction.

The gas turbine according to any preceding clause, wherein the cylindrical housing wall further includes at least one upstream cavity in the first side of the housing wall, the at least one upstream cavity being in fluid communication with the at least one slotted cooling passage.

The gas turbine according to any preceding clause, wherein the at least one upstream cavity is a slotted upstream cavity extending in the circumferential direction and extends between the first lateral direction and the second lateral direction.

The gas turbine according to any preceding clause, wherein the at least one upstream cavity extends in the axial direction along an axial length of the cylindrical housing wall from a first end of the at least one upstream cavity to a second end of the at least one upstream cavity, the first end of the at least one upstream cavity and the second end of the at least one upstream cavity being defined within the cylindrical housing wall.

The gas turbine according to any preceding clause, wherein the ignitor includes a shaft portion arranged within the ignitor housing, the shaft portion having a first end arranged proximal to the inner end of the ignitor housing, and the shaft portion including a hollow closed insulation cavity therewithin.

The gas turbine according to any preceding clause, wherein the hollow closed insulation cavity extends circumferentially about a centerline axis of the shaft portion, and has an axial length extending in an axial direction with respect to the centerline axis of the shaft portion from a first end of the hollow closed insulation cavity to a second end of the hollow closed insulation cavity.

The gas turbine according to any preceding clause, wherein the first end of the hollow closed insulation cavity is arranged proximal to the first end of the shaft portion and the second end of the hollow closed insulation cavity is arranged such that, when the ignitor is disposed within the ignitor housing with the first end of the shaft portion proximal to the inner end of the ignitor housing, the second end is arranged proximal to the at least one airflow inlet passage of the ignitor housing.

The gas turbine according to any preceding clause, wherein the combustor liner comprises an outer liner extending circumferentially about a combustor centerline axis, and an inner liner extending circumferentially about the combustor centerline axis, the combustion chamber being defined between the outer liner and the inner liner, and the outer casing surrounds the outer liner and defines the outer flow passage between the outer casing and the outer liner, and the ignitor housing extends through the outer liner and extends through the outer flow passage.

The gas turbine according to any preceding clause, wherein the outer liner comprises an outer shell and a heat shield panel connected with the outer shell to define a baffle cavity therebetween, and the hot surface side of the combustor liner comprising a hot surface side of the heat shield panel.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A combustor for a gas turbine, the combustor defining a combustor centerline axis and comprising:
   a combustor liner defining a combustion chamber in which combustion gases flow in a first direction with respect to the combustor centerline axis;
   an outer casing surrounding the combustor liner and defining an outer flow passage therebetween in which a flow of cooling air flows in the first direction within the outer flow passage;
   an ignitor housing extending through an ignitor opening through the combustor liner and extending through the outer flow passage, the ignitor housing having an inner end arranged proximally flush to a hot surface side of the combustor liner adjacent to the combustion chamber; and
   an ignitor disposed within the ignitor housing,
   wherein the ignitor housing includes a housing wall defining a perimeter of the ignitor housing, the housing wall having an upstream wall portion with respect to the first direction extending from the outer casing to the inner end of the ignitor housing, and a downstream wall portion with respect to the first direction extending from the outer casing to the inner end of the ignitor housing, and the housing wall including (a) at least one airflow inlet passage extending through a downstream surface of the downstream wall portion and arranged within the outer flow passage, and (b) at least one cooling passage within the downstream wall portion, the at least one cooling passage extending along a length of the downstream wall portion from the at least one airflow inlet passage and through the inner end of the downstream wall portion, the at least one cooling passage being in fluid communication with the at least one airflow inlet passage.

2. The combustor according to claim 1, further comprising an insulating layer disposed between the ignitor housing and the ignitor.

3. The combustor according to claim 1, wherein the at least one cooling passage is arranged to provide a flow of cooling air to the hot surface side of the combustor liner at a downstream side of the ignitor opening.

4. The combustor according to claim 1, wherein the ignitor housing is coupled to the outer casing, and the ignitor housing extends through the ignitor opening and through the combustor liner with a predetermined clearance therebetween.

5. The combustor according to claim 1, wherein the perimeter of the ignitor housing defines a circular perimeter and the ignitor housing comprises a cylindrical housing wall, the cylindrical housing wall having an axial opening therethrough extending along a centerline axis of the cylindrical housing wall, the ignitor being disposed within the axial opening.

6. The combustor according to claim 1, wherein the at least one airflow inlet passage comprises a plurality of airflow inlet passages extending through the downstream surface of the downstream wall portion and providing fluid communication between the outer flow passage and the at least one cooling passage.

7. The combustor according to claim 1, wherein the at least one cooling passage comprises at least one slotted cooling passage extending in a circumferential direction within the downstream wall portion with respect to a centerline axis of the housing wall.

8. The combustor according to claim 7, wherein the centerline axis defines an axial direction, a flow axis of the housing wall extends orthogonal to the centerline axis and parallel to the first direction and defines an upstream direction and a downstream direction, and a lateral axis of the housing wall extends through the centerline axis and extends orthogonal to the flow axis and defines a first lateral direction and a second lateral direction, the at least one slotted cooling passage extending between the first lateral direction of the lateral axis and the second lateral direction of the lateral axis.

9. The combustor according to claim 8, wherein the at least one slotted cooling passage comprises a first slotted cooling passage extending in the circumferential direction between the downstream direction and the first lateral direction, and a second slotted cooling passage extending between the downstream direction and the second lateral direction.

10. The combustor according to claim 8, wherein the housing wall further includes at least one upstream cavity in the upstream wall portion of the housing wall, the at least one upstream cavity being in fluid communication with the at least one slotted cooling passage.

11. The combustor according to claim 10, wherein the at least one upstream cavity is a slotted upstream cavity extending in the circumferential direction and extends between the first lateral direction and the second lateral direction.

12. The combustor according to claim 11, wherein the at least one upstream cavity extends in the axial direction along an axial length of the housing wall from a first end of the at least one upstream cavity to a second end of the at least one upstream cavity, the first end of the at least one upstream cavity and the second end of the at least one upstream cavity being defined within the housing wall.

13. The combustor according to claim 1, wherein the ignitor includes a shaft portion arranged within the ignitor housing, the shaft portion having a first end arranged proximal to the inner end of the ignitor housing, and the shaft portion including a hollow closed insulation cavity therewithin.

14. The combustor according to claim 13, wherein the hollow closed insulation cavity extends circumferentially about a centerline axis of the shaft portion, and has an axial length extending in an axial direction with respect to the centerline axis of the shaft portion from a first end of the hollow closed insulation cavity to a second end of the hollow closed insulation cavity.

15. The combustor according to claim 14, wherein the first end of the hollow closed insulation cavity is arranged proximal to the first end of the shaft portion and the second end of the hollow closed insulation cavity is arranged such that, when the ignitor is disposed within the ignitor housing with the first end of the shaft portion proximal to the inner end of the ignitor housing, the second end is arranged proximal to the at least one airflow inlet passage of the ignitor housing.

16. The combustor according to claim 1, wherein the combustor liner comprises an outer liner extending circumferentially about the combustor centerline axis, and an inner liner extending circumferentially about the combustor centerline axis, the combustion chamber being defined between the outer liner and the inner liner, and the outer casing surrounds the outer liner and defines the outer flow passage between the outer casing and the outer liner, and the ignitor housing extends through the outer liner and extends through the outer flow passage.

17. The combustor according to claim 16, wherein the outer liner comprises an outer shell and a heat shield panel connected with the outer shell to define a baffle cavity therebetween, and the hot surface side of the combustor liner comprising a hot surface side of the heat shield panel.

18. A gas turbine comprising:
a compressor section; and
a combustor, the compressor section providing a flow of compressed air to the combustor, the combustor defining a combustor centerline axis and comprising:
  a combustor liner defining a combustion chamber in which combustion gases flow in a first direction with respect to the combustor centerline axis;
  at least one swirler assembly providing a flow of the compressed air and a fuel as a fuel-air mixture to the combustion chamber;
  an outer casing surrounding the combustor liner and defining an outer flow passage therebetween in which a flow of cooling air flows in the first direction within the outer flow passage, at least a portion of the flow of compressed air being routed through the outer flow passage;
  an ignitor housing extending through an ignitor opening through the combustor liner and extending through the outer flow passage, the ignitor housing having an inner end arranged proximally flush to a hot surface side of the combustor liner adjacent to the combustion chamber; and
  an ignitor disposed within the ignitor housing to ignite the fuel-air mixture,
  wherein the ignitor housing includes a housing wall defining a perimeter of the ignitor housing, the housing wall having an upstream wall portion with respect to the first direction extending from the outer casing to the inner end of the ignitor housing, and a downstream wall portion with respect to the first direction extending from the outer casing to the inner end of the ignitor housing, and the housing wall including (a) at least one airflow inlet passage extending through a downstream surface of the downstream wall portion and arranged within the outer flow passage, and (b) at least one cooling passage within the downstream wall portion the at least one cooling passage extending along a length of the downstream wall portion from the at least one airflow inlet passage and through the inner end of the downstream wall portion, the at least one cooling passage being in fluid communication with the at least one airflow inlet passage.

19. The gas turbine according to claim 18, wherein the ignitor operates to ignite the fuel-air mixture within the combustion chamber, and the at least one cooling passage in the ignitor housing provides a flow of the compressed air from the outer flow passage therethrough to provide a cooling airflow to a downstream side of the ignitor opening through the combustor liner at the hot surface side of the combustor liner.

20. The gas turbine according to claim 19, wherein the ignitor housing includes a cylindrical housing wall, and the at least one cooling passage comprises at least one slotted cooling passage extending in a circumferential direction within the downstream wall portion with respect to a centerline axis of the housing wall.

* * * * *